(12) United States Patent
Stockhausen et al.

(10) Patent No.: US 6,561,145 B1
(45) Date of Patent: May 13, 2003

(54) TORQUE CONTROL METHOD AND SYSTEM IN AN ENGINE WITH A FULLY VARIABLE INTAKE VALVE

(75) Inventors: William Francis Stockhausen, Northville, MI (US); Diana D. Brehob, Dearborn, MI (US); John Curtis Hickey, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/717,768

(22) Filed: Nov. 21, 2000

(51) Int. Cl.⁷ .................................................. F01L 1/34
(52) U.S. Cl. ............................. 123/90.15; 123/198 F; 123/406.23; 123/481
(58) Field of Search ............... 123/90.15, 90.16, 123/90.17, 90.18, 198 F, 316, 406.23, 436, 481; 477/111

(56) References Cited

U.S. PATENT DOCUMENTS

| | | | | |
|---|---|---|---|---|
| 4,009,694 A | * | 3/1977 | Firey | 123/90.12 |
| 4,206,728 A | * | 6/1980 | Trenne | 123/90.12 |
| 4,499,870 A | * | 2/1985 | Aoyama | 123/198 F |
| 5,056,378 A | * | 10/1991 | Aimone | 74/858 |
| 5,090,202 A | * | 2/1992 | Hitomi | 60/602 |
| 5,184,577 A | * | 2/1993 | Kato. | 123/90.15 |
| 5,280,770 A | * | 1/1994 | Satou | 123/90.15 |
| 5,374,224 A | * | 12/1994 | Huffmaster | 477/181 |
| 5,398,544 A | * | 3/1995 | Lipinski | 73/118.2 |
| 5,443,050 A | * | 8/1995 | Hitomi et al. | 123/492 |
| 5,456,224 A | * | 10/1995 | Riley | 123/90.16 |
| 5,572,970 A | * | 11/1996 | Fukumura | 123/198 F |
| 5,647,312 A | | 7/1997 | Salber et al. | |
| 5,669,341 A | | 9/1997 | Ushirono et al. | |
| 5,934,263 A | | 8/1999 | Russ et al. | |
| 5,937,811 A | * | 8/1999 | Motosugi et al. | 123/90.18 |
| 6,009,841 A | | 1/2000 | Hickey | |
| 6,260,525 B1 | * | 7/2001 | Moyer | 123/198 F |
| 6,390,063 B1 | * | 5/2002 | Obata et al. | 123/399 |

\* cited by examiner

Primary Examiner—Thomas Denion
Assistant Examiner—Jamie Corrigan
(74) Attorney, Agent, or Firm—Diana D. Brehob; Allan J. Lippa

(57) ABSTRACT

A system and a method to control torque during a mode transition in an internal combustion engine with a fully variable intake valve is disclosed. The mode transition may be a change in the number of active cylinders in a variable displacement engine, a change in compression ratio in a variable compression ratio engine, a gear change in a transmission coupled to the engine, a traction control event, and a rapid change in driver demand.

38 Claims, 3 Drawing Sheets

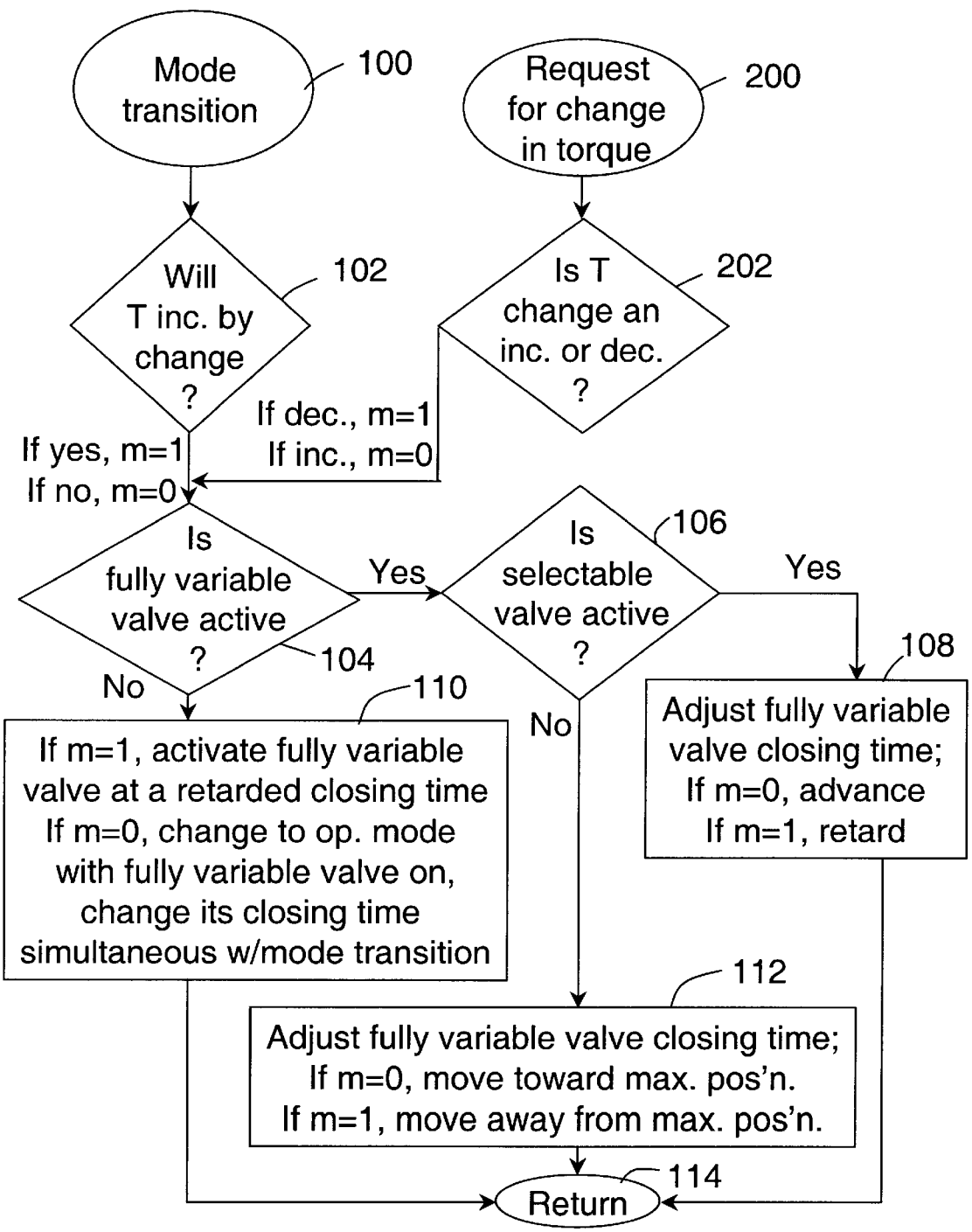

US 6,561,145 B1

TORQUE CONTROL METHOD AND SYSTEM IN AN ENGINE WITH A FULLY VARIABLE INTAKE VALVE

FIELD OF THE INVENTION

The present invention relates to controlling torque in an internal combustion engine equipped with a hybrid valvetrain in response to a change in operating mode.

BACKGROUND

There are situations in the operation of an internal combustion engine, which lead to torque disturbances. Examples of situations where a torque disturbance must be managed to provide a smooth torque trajectory are a transition in a variable displacement engine (VDE, an engine in which a portion of the cylinders are deactivated during light load operation to improve fuel economy), a transition in compression ratio in a variable compression ratio (VCR) engine, and a gear shift in a transmission coupled to the engine, termed mode transitions herein. Alternatively, there are situations in which a rapid change in torque is desirable: a traction control event, a driver demand for a rapid change in torque, and other mode transitions.

SUMMARY OF THE INVENTION

A method is disclosed for making a mode transition in a multi-cylinder internal combustion engine. The mode transition is one which affects engine torque. Each cylinder is coupled to a fully variable intake valve. The method includes the steps of: determining a desired torque trajectory, determining a next scheduled cylinder due to undergo an intake stroke, computing an intake valve closing time of the fully variable intake valve for he next scheduled cylinder to provide a desired amount of air in the next scheduled cylinder based on the desired torque trajectory, providing an amount of fuel to the next scheduled cylinder in proportion to the desired air, commanding the intake valve closing time to the fully variable intake valve of the scheduled next cylinder; and combusting the fuel and air in the next scheduled cylinder to provide the desired engine torque trajectory.

A valve system in a multi-cylinder internal combustion engine for making a mode transition is disclosed. The mode transition affects engine torque. The system consists of a fully variable intake valve coupled to the cylinder and an engine control unit operably connected to the engine and the fully variable intake valve. The engine control unit determines a desired torque trajectory, determines a next cylinder scheduled to undergo an intake stroke, computes an intake valve closing time of the fully variable intake valve for the next scheduled cylinder to provide a desired amount of air in the next scheduled cylinder based on the desired torque trajectory, computes an amount of fuel to provide to the next scheduled cylinder, and commands the intake valve closing time to the fully variable intake valve of the scheduled next cylinder.

An advantage of the present invention is that torque production can be affected within one engine cycle in an engine with a valvetrain having a fully variable intake valve. The invention may be applied in system where torque changes occur such as VDE, VCR, or by transmission gear shifts.

A further advantage of the present invention is that by providing a variable timing device on the camshaft actuating the intake valve, the engine's volumetric efficiency is improved which leads to higher peak power.

A further advantage of the present invention is that exhaust pumping work can be minimized and expansion work on the piston can be maximized by optimizing the exhaust valve opening time as a function of engine speed and torque, which is provided by a variable timing device on the exhaust camshaft. Both a reduction in exhaust pumping work and an increase in expansion work improves the overall engine efficiency.

A further advantage of the present invention is that by providing both flexible intake and exhaust timing, the beginning, the end, and the duration of valve overlap are variable, valve overlap being the time over which at least one intake and one exhaust are open simultaneously. The additional flexibility allows more control to simultaneously optimize the amount of exhaust residuals trapped in the cylinder and reduce intake pumping work.

The inventors of the present invention have also recognized that a valve system with a fully variable intake valve and an exhaust cam phaser may be employed to deactivate selected cylinders in an engine to obtain variable displacement engine efficiency improvements.

BRIEF DESCRIPTION OF THE DRAWINGS

FIG. 4 is a flowchart of control logic by which the present invention can be used to advantage.

DETAILED DESCRIPTION OF THE PREFERRED EMBODIMENTS

Figure 1:
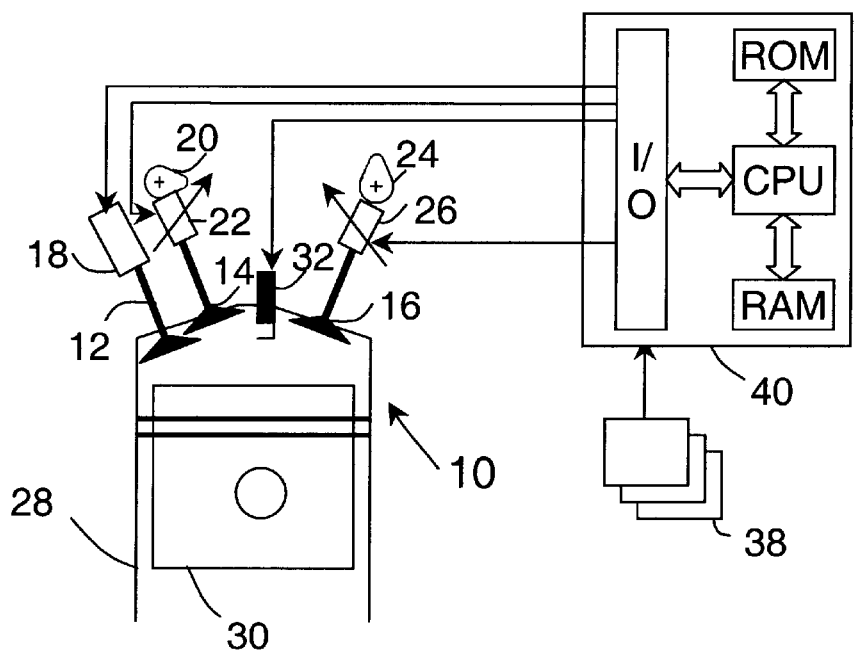
FIG. 1 is a schematic of a single cylinder of a hybrid valvetrain engine.

In FIG. 1 a cross-section of a hybrid valvetrain engine 10 is shown. Intake valve 12 is actuated by an element 18, which may be electromechanical or electrohydraulic. In either case, the valve opening and closing events of intake valve 12 are not coupled to the rotation of the engine 10. This is termed a fully variable intake valve 12 herein. Intake valve 14 is actuated by a camshaft 20, which is coupled (connection not shown) to the engine 10 and rotates at half engine 10 rotational speed. Intake valve 14 is provided with a valve deactivator 22, which allows intake valve 14 to be deactivated. As intake valve 14 may be activated or deactivated, it is termed selectable intake valve 14 herein. Exhaust valve 16 is also camshaft 24 actuated. In FIG. 1, camshaft 20 and camshaft 24 are shown as two both the selectable intake valve 14 and the exhaust valve 16 with a single camshaft (configuration not shown). Exhaust valve 16 is also provided with a valve deactivator 26. A piston 30 reciprocates within cylinder 28.

The engine of FIG. 1 may be a variable compression ratio (VCR) engine. The motivation for VCR is fuel efficiency. Ideal cycle efficiency is related to compression ratio:

$$\eta = 1 - \frac{1}{CR^{\gamma-1}}$$

where $\eta$ is efficiency, CR is compression ratio, and $\gamma$ is the ratio of specific heats of the working fluid. The limiting factor on compression ratio, in homogeneous-charge, sparkignited engines, is autoignition or engine knock, which tends to occur at high engine torques and low engine speeds. The compression ratio of production engines is compromised by engine knock. VCR, however, allows operation at a higher compression ratio at most conditions and operation at lower compression only as dictated by knock. Thus, the cycle efficiency is improved for most operating conditions. A number of mechanisms have been proposed to alter compression ratio. The connecting rod (not shown in FIG. 1), which connects the piston to the crankshaft, can be of variable length. Piston 30 could be a two-piece piston in which the upper half can be raised to affect the compression ratio. Most of the mechanisms that have been proposed provide two compression ratios, i.e., not infinitely variable. A mode transition from a low compression ratio to a high compression ratio causes a torque rise, if no other action were taken. Conversely, a mode transition in which compression ratio is lowered reduces torque, if no other action is taken.

Continuing with FIG. 1, the electronic control unit 40 provides signals to the valve deactivators 22 and 26, the fully variable intake valve 18, the spark plug 32, and others not shown. The output from the electronic control unit 40 is based on input signals from various sensors 38 which may include a mass airflow sensor, a pedal position sensor, engine speed, temperatures sensors, and others.

A variable displacement engine (VDE)improves fuel economy by deactivating some of the cylinders of a multi-cylinder engine while the remaining cylinders carry the desired load. The primary reason for the fuel economy savings is that the working cylinders operate at a higher specific loading and therefore greater manifold pressure, which results in reduced intake stroke pumping work. As a mode transition is made from operating a portion of the cylinders to operating all the cylinders, as an example, the torque would increase proportionally is no other measure were taken. An example of a mode transition in which a torque decrease occurs, if no other action is taken, is one in which a portion of cylinders are deactivated.

Figure 2:
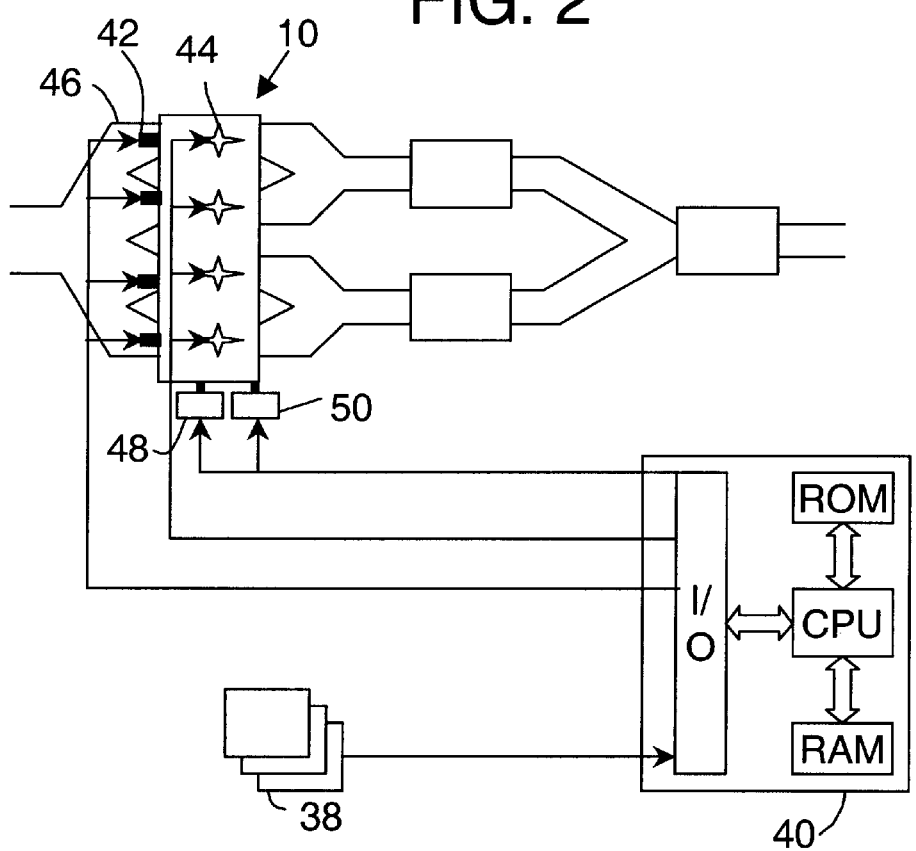
FIG. 2 is a schematic of a multi-cylinder hybrid valvetrain engine indicating connections between the engine controller and sensors associated with engine operation.

FIG. 1 shows a single cylinder of a multi-cylinder engine 10 of FIG. 2. A variable displacement engine (VDE) is one in which a subset of the cylinders of a multi-cylinder engine can be deactivated to improve fuel efficiency at low torque operation. Typically, cylinders are deactivated maintaining the intake and exhaust valves in a closed position so that flow to and from the cylinder ceases; also, fuel injection is discontinued to deactivated cylinders. There are several cylinder head configurations which could be employed to deactivate the valves. First, a cylinder head provided with a fully variable intake valve 12 and an exhaust valve 16 with a valve deactivator 26 has the capability to deactivate all valves disposed in the cylinder. Secondly, a cylinder head with a fully variable intake valve 12, a selectable intake valve 14 with a valve deactivator 24, and an exhaust valve 16 with a valve deactivator 26 provides the ability to deactivate all three valves. Thirdly, a cylinder head with a fully variable intake valve 12 and an exhaust valve 16 with a variable cam timing mechanism 50 on the exhaust camshaft 24 provides an alternative means to provide VDE function, i.e., deactivate cylinders. The exhaust cam timing is adjusted so that the exhaust gases pushed into the exhaust manifold as the piston 30 rises in the cylinder 28 are pulled back into the combustion chamber as the piston 30 descends in the cylinder 28. As the transfer of exhaust gases is accomplished at low pressure drop, the pumping work is minimal. The exhaust variable cam mechanism 50 would be employed as a cost saving measure and could be used whether or not a selectable intake valve 24 is contained in the cylinder head.

In FIG. 1, a single cylinder of a hybrid valvetrain engine 10 is shown. However, the present invention applies to an engine with a plurality of cylinders. A four-cylinder engine 10 is shown in FIG. 2, which is provided with air through an intake manifold 46 and with fuel through fuel injectors 42. FIG. 2 indicates port fuel injection; however, the present invention is equally applicable to direct fuel injection in which the fuel injectors are mounted directly in the cylinders. Spark plugs 44 are mounted in the cylinders. An intake variable valve timing mechanism 48 and an exhaust variable valve timing mechanism 50 are shown in FIG. 2. Typically, these mechanisms allow the adjustment of the valve opening and closing events by rotating the camshaft with respect to the crankshaft. Thus, the open duration is not affected, only the phasing of the open duration. These devices tend to require several hundred milliseconds, typically several engine cycles, to achieve the demanded position. The engine control unit 40 receives signals from various sensors 52 which may be indicating airflow, engine speed, pedal position, coolant temperature, and others. Based on the inputs, the engine control unit 40, computes and commands signals to the fuel injectors 42, the spark plugs 44, the intake cam phaser 48, the exhaust cam phaser 50 and others.

Figure 3:
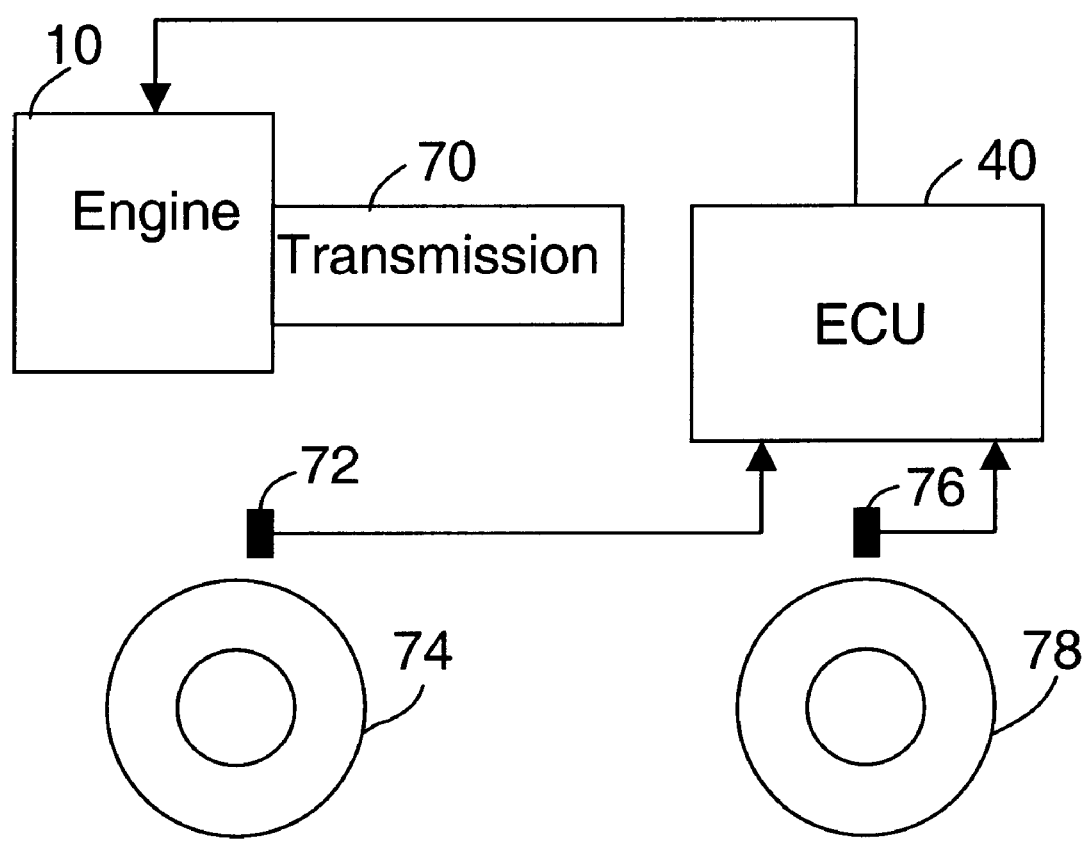
FIG. 3 is a schematic of a vehicle showing the salient hardware involved in a traction control system.

Referring now to FIG. 3, engine 10 is coupled to transmission 70. A gear shift within the transmission is another example of a torque disturbance which must be managed by the engine controller 40 in addition to the torque disturbance described when transitioning between cylinder sets in a VDE engine.

Also shown in FIG. 3 are salient pieces of hardware involved in detecting that the vehicle's driving wheels have lost traction. The engine control unit 40 receives signals from a wheel speed sensor 72, which senses wheel speed from the driving wheels 74 and a wheel speed sensor 76, which senses wheel speed from the non-driving wheels 78. If the driving wheels 74 rotate faster than the non-driving wheels 78, wheel slippage is detected. If wheel slippage is sensed, the engine control unit commands a reduction in engine torque to the engine 10. Traction control is another example in which the present invention can be used to advantage to provide sudden torque diminution demanded by the engine control unit 40.

Referring to FIG. 4, a sample logic flowchart, which would be performed within the engine controller 40, is shown which illustrates the invention. The process is initiated by request for a mode transition in 100. The request for a mode transition 100 could be a VDE transition, a VCR transition, a gear shift, a transition in combustion mode of stratified charge engine, a transition in combustion mode of a homogeneous-charge, compression-ignition engine, transitions in the operating mode of a hybrid powertrain engine, or others. In decision block 102, it is determined whether the transition will cause a torque increase. This question is applicable, eg., to a transition in a VCR engine in which an increase in compression ratio causes a torque increase and a decrease in compression ratio causes a torque decrease. If affirmative in block 102, a flag, m, is set to 1; and if negative, m is set to 0. An alternative request to enter the flowchart of FIG. 4 arises when a demand for a rapid change in torque arises as in block 200. Examples of a demand for a rapid change in torque may be a driver demand for a sudden increase or decrease in torque or a traction control event. Control proceeds to decision block 202 in which it is determined whether the change in torque is an increase or a decrease. If a decrease is requested, m is set to 1; if an increase is requested, m is set to 0.

The selectable intake valve 14 may be turned on or off in one engine revolution. The fully variable valve 12 opens or closes only under command from the engine control unit 40. As such, the valve may be deactivated or reactivated within one revolution and the timing of the valve can be affected from event to event. Keeping the relative flexibility of the two types of valves in mind and referring now to FIG. 4, both decision blocks 102 and 202 pass control to block 104, in which it is determined whether the fully variable valve 12 is active. If yes, a check of whether the selectable valve 14 is active is made in block 106. If yes, the fully variable valve closing time is adjusted. The timing is advanced if m is 0 and is retarded if m is 1 in block 108. If both valves are open, as is the case if the logic control is in block 108, it is known that closing time of the fully variable valve 12 is later than that of the selectable valve 14. Otherwise, the fully variable valve 12 would not control the amount of charge trapped in the cylinder. If additional air, i.e., greater torque, is desired, which is the case if m is 0, the timing is advanced. This causes the timing of the fully variable valve 12 to move closer to the timing which traps the maximum amount of charge. If m is 1, the timing of the fully variable valve 12 is retarded. The effect of this is to cause it to close during the compression stroke. This causes some of the air to be pushed back into the intake manifold, thereby reducing the amount of charge trapped in the cylinder. From block 108, control returns in block 114. If in block 106, the result is negative, in block 112, the fully variable valve closing time is adjusted to deliver desired torque. If m is 0, the fully variable valve timing is adjusted toward the maximum position. Because in block 112 the selectable intake valve 14 is not active, the fully variable valve 12 can provide the desired torque with either a closing time that is advanced of the maximum position and a closing time which is retarded of the maximum position. The maximum position is that valve timing which provides the maximum air to be delivered to the cylinder. Thus, if the fully variable valve closing time is advanced with respect to the maximum position and m equals 0, the valve closing time of the fully variable valve closing time is retarded. Conversely, if the fully variable valve closing time is retarded with respect to the maximum position and m equals 0, the valve closing time of the fully variable valve closing time is advanced. Similarly, the advancement or retardation of the fully variable valve closing time can be found for the case of m equal to 1. If in block 104 the result is negative, the fully variable valve 12 is activated in block 110. If m is 1, the fully variable valve 12 is activated with a closing time which is retarded from the timing which would induct the maximum amount of air into the cylinder. As described above, this causes some of the air brought into the cylinder to be pushed back out during the compression stroke; thus, the torque is reduced by this measure to counteract the torque increase accompanying the mode transition. If in block 110 m is 0, this is a situation in which only the selectable valve 14 is active and in which a mode transition will cause a torque decrease. Prior to the mode transition, only the selectable valve 14, which has fixed valve timing, is operating. Because of its fixed valve events, torque is managed by a throttle, spark advance, change in air-fuel ratio, or other engine parameter which has authority over torque. Activating the fully variable valve 12 has the capability to reduce torque but has little authority in increasing torque. Thus, the situation of block 110 when m is 0 is a special case in which a change to an operating mode with both the fully variable valve 12 and the selectable valve 14 operating is made first. Depending on the torque management technique employed with only the selectable valve 14 operating, the change in operating mode from selectable valve 14 only to both valves operating can be accomplished in one to several engine revolutions. After the change in operating mode has been accomplished, i.e., the fully variable valve 12 is operational and the closing time of the fully variable valve 12 is the control parameter over engine torque, the mode transition can occur. Simultaneously, the fully variable valve closing time is advanced which increases trapped air in the cylinder. This measure counteracts the decrease in torque accompanying the mode transition.

While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims.

What is claimed:

1. A method for controlling torque during a mode transition in an engine, the engine having a fully variable intake valve communicating with an engine cylinder, the method, comprising the steps of:
   computing an intake valve closing time of the fully variable intake valve for a next scheduled cylinder having an intake stroke to provide a desired amount of air in the next scheduled cylinder; and
   closing the fully variable intake valve of said scheduled next cylinder at said computed closing time to obtain a desired torque trajectory.

2. The method of claim 1 wherein said desired torque trajectory defines a constant torque over time.

3. The method of claim 2 wherein said mode transition comprises activating a group of cylinders that were previously de-activated.

4. The method of claim 2 wherein said mode transition comprises de-activating a group of cylinders that were previously activated.

5. The method of claim 2 wherein said mode transition comprises changing a compression ratio in an engine cylinder from a first compression ratio to a second compression ratio.

6. The method of claim 2 wherein said mode transition comprises shifting gears in a transmission coupled to the engine.

7. The method of claim 2 wherein said mode transition comprises a driver demanded change in torque.

8. The method of claim 1 wherein said desired torque trajectory defines a change in engine torque over time.

9. The method of claim 8 wherein said mode transition comprises a traction control event.

10. A method for controlling torque in an engine, the engine having a fully variable intake valve communicating with an engine cylinder, the method comprising:
    maintaining an engine torque during an engine mode transition by adjusting a closing time of the fully variable intake valve;
    determining a desired engine torque;
    determining an expected engine torque which would result in the event that said closing time of the fully variable intake valve were not adjusted; and
    determining said closing time of the fully variable intake valve based on a difference between said desired engine torque and said expected engine torque.

11. The method of claim 10, further comprising:
    indicating when an engine mode transition occurs; and enabling the fully variable intake valve when said engine mode transition occurs.

12. A method for operating an engine, the engine having a fully variable intake valve communicating with an engine cylinder, the method comprising:

computing a new intake valve closing time of the fully variable intake valve as a function of a desired increase in an amount of inducted air for a next intake stroke of the cylinder next scheduled for an intake stroke wherein said increased inducted air into said cylinder is based on a desired torque increase and causes said torque increase within one engine revolution; and closing the fully variable intake valve of said cylinder at said new closing time.

13. The method of claim 12, further comprising injecting a quantity of fuel into said inducted air wherein said quantity of fuel is in a stoichiometric proportion to said inducted air.

14. A method for making a mode transition in an internal combustion engine with a plurality of cylinders, coupled to each of the cylinders is a fully variable intake valve, wherein the mode transition affects engine torque, the method comprising the steps of:

determining a desired torque trajectory;

determining a next scheduled cylinder due to undergo an intake stroke;

computing an intake valve closing time of the fully variable intake valve for said next scheduled cylinder to provide a desired amount of air in said next scheduled cylinder based on said desired torque trajectory;

providing an amount of fuel to said next scheduled cylinder in proportion to said desired air;

commanding said intake valve closing time to the fully variable intake valve of said scheduled next cylinder; and combusting said fuel and said desired air in said next scheduled cylinder to provide said desired engine torque trajectory.

15. The method as recited in claim 14, wherein an exhaust valve is coupled to each of said cylinders, wherein said exhaust valve is provided with a valve deactivator to allow deactivation of selected cylinders by deactivating the fully variable intake valve and said exhaust valve.

16. The method as recited in claim 15, wherein the mode transition is between a first mode in which said exhaust valve and the fully variable intake valve are active in a first subset of cylinders and a second mode in which said exhaust valve and the fully variable intake valve are active in a second subset of cylinders, wherein said first subset of cylinders and said second subset of cylinders may be overlapping sets.

17. The method as recited in claim 16, wherein said closing time of the intake valve is changed to a closing time away from a predetermined closing time in the event that said first subset of cylinders comprises a fewer number of cylinders than said second subset of cylinders.

18. The method as recited in claim 17, wherein said predetermined time is a closing time of the fully variable intake valve which provides the maximum amount of fresh air in the cylinder.

19. The method as recited in claim 14, wherein the mode transition is between a first and a second compression ratio, wherein said first and said second compression ratios are not equal.

20. The method as recited in claim 14, wherein the mode transition is between a first and second gear ratio in a transmission coupled to the engine.

21. The method as recited in claim 14, wherein the mode transition is between a first and a second engine torque, wherein said first and second engine torques are not equal.

22. The method as recited in claim 14, wherein said first engine torque and said second engine torque are based on a driver demand for a change in engine torque.

23. The method as recited in claim 14, wherein said first engine torque and said second engine torque are based on an engine controller determining that a rapid torque decrease is desired to provide traction control to a vehicle, wherein said engine controller is coupled to said vehicle and to the engine disposed in said vehicle.

24. A valve system in an internal combustion engine with a plurality of cylinders for making a mode transition which affects engine torque, wherein the valve system comprises:

a fully variable intake valve coupled to the cylinder; and an engine control unit operably connected to said engine and said fully variable intake valve, wherein said engine control unit determines a desired torque trajectory, determines a next cylinder scheduled to undergo an intake stroke, computes an intake valve closing time of the fully variable intake valve for said next scheduled cylinder to provide a desired amount of air in said next scheduled cylinder based on said desired torque trajectory, computes an amount of fuel to provide to said next schedule cylinder, and commands said intake valve closing time to the fully variable intake valve of said scheduled next cylinder.

25. The valve system as recited in claim 24, wherein said engine controller, which is coupled to spark plugs disposed in the cylinders, computes a spark timing and commands said spark timing to said spark plugs to initiate combustion of said desired air and said fuel within the cylinder.

26. The valve system as recited in claim 24, wherein the valve system further comprises:

an exhaust camshaft coupled to the engine;

an exhaust valve actuated by said camshaft; and an exhaust valve deactivator coupled to said exhaust valve so that selected cylinders are capable of being disabled by deactivating said exhaust valve and said fully variable intake valve.

27. The valve system as recited in claim 24, further comprising:

an exhaust camshaft coupled to the engine;

an exhaust valve actuated by said camshaft; and a variable valve timing mechanism coupled to said exhaust camshaft to adjust an exhaust valve timing to minimize pumping work and maximize expansion work of the engine.

28. The valve system as recited in claim 24, further comprising a selectable intake valve coupled to the cylinder to increase airflow into the cylinder.

29. The valve system as recited in claim 28, further comprising:

an intake camshaft coupled to the engine to actuate said selectable intake valve; and a variable valve timing mechanism coupled to said intake camshaft to provide improved airflow to the cylinder at high engine speeds.

30. A method for controlling torque in an internal combustion engine in response to a mode transition of the engine, the engine having a plurality of cylinders in which are disposed a fully variable intake valve and at least one exhaust valve actuated by a camshaft, the method comprising the steps of:

determining a desired torque trajectory;

determining a next scheduled cylinder due to undergo an intake stroke;

computing an intake valve closing time of the fully variable intake valve for said next scheduled cylinder to provide a desired amount of air in said next scheduled cylinder based on said desired torque trajectory;

providing an amount of fuel to said next scheduled cylinder in proportion to said desired air;

commanding said intake valve closing time to the fully variable intake valve of said scheduled next cylinder; and combusting said fuel and said desired air in said next scheduled cylinder to provide said desired engine torque trajectory during said mode transition of said engine.

31. The method as recited in claim 30, wherein the closing time of the fully variable valve is changed away from a predetermined closing time in the event that the engine torque would increase in response to said mode transition if no action were taken and the closing time of the fully variable valve is changed toward a predetermined closing time in the event that the engine torque would decrease in response to said mode transition if no action were taken.

32. The method as recited in claim 31, wherein the predetermined closing time is that which causes the fully variable valve to induct the maximum amount of fresh air into the cylinder.

33. The method as recited in claim 30, wherein a selectable intake valve is disposed in the cylinders, wherein the closing time of the fully variable valve is retarded in the event that the selectable intake valve is active and in the further event that the engine torque would increase in response to said mode transition if no action were taken, wherein the closing time of the fully variable valve is advanced in the event that the selectable intake valve is active and in the further event that the engine torque would decrease in response to said mode transition if no action were taken.

34. The method as recited in claim 30, wherein an exhaust valve is coupled to each of said cylinders, wherein said exhaust valve is provided with a valve deactivator to allow deactivation of selected cylinders by deactivating the fully variable intake valve and said exhaust valve, wherein the mode transition is between a first mode in which said exhaust valve and the fully variable intake valve are active in a first subset of cylinders and a second mode in which said exhaust valve and the fully variable intake valve are active in a second subset of cylinders, wherein said first subset of cylinders and said second subset of cylinders may be overlapping sets.

35. The method as recited in claim 34, wherein said closing time of the intake valve is changed to a closing time away from a predetermined closing time in the event that said first subset of cylinders comprises a fewer number of cylinders than said second subset of cylinders.

36. The method as recited in claim 35, wherein said predetermined time is a closing time of the fully variable intake valve which provides the maximum amount of fresh air in the cylinder.

37. The method as recited in claim 30, wherein the mode transition is between a first and a second compression ratio, wherein said first and said second compression ratios are not equal.

38. The method as recited in claim 30, wherein the mode transition is between a first gear and a second gear within a transmission coupled to the engine.

* * * * *